(12) United States Patent
Park

(10) Patent No.: US 10,974,762 B2
(45) Date of Patent: Apr. 13, 2021

(54) DAMPING CONTROL METHOD AND SYSTEM OF STEERING SYSTEM FOR VEHICLE

(71) Applicants: Hyundai Motor Company, Seoul (KR); Kia Motors Corporation, Seoul (KR)

(72) Inventor: Young Uk Park, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 160 days.

(21) Appl. No.: 16/282,702

(22) Filed: Feb. 22, 2019

(65) Prior Publication Data

US 2020/0140006 A1    May 7, 2020

(30) Foreign Application Priority Data

Nov. 5, 2018 (KR) .......................... 10-2018-0134693

(51) Int. Cl.
    *B62D 5/04*    (2006.01)
(52) U.S. Cl.
    CPC ......... *B62D 5/0472* (2013.01); *B62D 5/0466* (2013.01); *B62D 5/0463* (2013.01)
(58) Field of Classification Search
    CPC ....................... B62D 5/0466; B62D 5/0472
    See application file for complete search history.

(56) References Cited

U.S. PATENT DOCUMENTS

| | | | |
|---|---|---|---|
| 6,450,287 B1* | 9/2002 | Kurishige | B62D 5/0466 180/443 |
| 8,731,775 B2* | 5/2014 | Kobayashi | B62D 5/0466 701/41 |
| 2006/0235591 A1* | 10/2006 | Tamaizumi | B62D 5/0466 701/41 |
| 2009/0125189 A1* | 5/2009 | Matsumura | B62D 5/0466 701/42 |

(Continued)

FOREIGN PATENT DOCUMENTS

| | | |
|---|---|---|
| JP | 2002-104210 A | 4/2002 |
| JP | 2002-104220 A | 4/2002 |

(Continued)

*Primary Examiner* — Thomas G Black
*Assistant Examiner* — Sara J Lewandroski
(74) *Attorney, Agent, or Firm* — Morgan, Lewis & Bockius LLP

(57) ABSTRACT

A damping control method of steering system may include determining, by a controller, a basic damping value based on a vehicle velocity, a steering angular velocity, and an output value of a steering motor when it is determined that steering for restoring a steering wheel to a steering angle neutral position is to be performed; determining, by the controller, whether a driver is in a hand-off state in which the driver takes its hands off the steering wheel according to signals reflecting a steering state and a behavior of a vehicle; compensating, by the controller, for the basic damping value so that the basic damping value is increased and determining a final damping value when it is determined that the driver is in the hand-off state; and controlling, by the controller, the steering motor with the final damping value obtained by the compensation, and restoring and steering the steering wheel.

11 Claims, 3 Drawing Sheets

(56) References Cited

U.S. PATENT DOCUMENTS

| | | | | |
|---|---|---|---|---|
| 2015/0066306 A1* | 3/2015 | Kodera | ................ | B62D 5/0463 |
| | | | | 701/43 |
| 2015/0210273 A1* | 7/2015 | Kaufmann | ............. | B62D 1/286 |
| | | | | 701/1 |
| 2017/0066473 A1* | 3/2017 | Yu | ............................ | B62D 6/10 |
| 2017/0144697 A1* | 5/2017 | Lim | ....................... | B62D 6/008 |
| 2017/0247051 A1* | 8/2017 | Matsuo | ................... | B62D 6/08 |
| 2019/0002014 A1* | 1/2019 | Shah | ................... | B62D 5/0463 |
| 2019/0077448 A1* | 3/2019 | Matsuo | ................ | B62D 5/0466 |
| 2019/0100235 A1* | 4/2019 | Min | ..................... | B62D 5/0466 |
| 2019/0126975 A1* | 5/2019 | Prahlad | ............... | B62D 5/0472 |
| 2019/0322311 A1* | 10/2019 | Aoki | .................... | B62D 15/025 |

FOREIGN PATENT DOCUMENTS

| | | |
|---|---|---|
| JP | 2005-041279 A | 2/2005 |
| JP | 2009-113512 A | 5/2009 |
| KR | 10-2011-0104647 A | 9/2011 |

\* cited by examiner

DAMPING CONTROL METHOD AND SYSTEM OF STEERING SYSTEM FOR VEHICLE

CROSS REFERENCE TO RELATED APPLICATION

The present application claims priority to Korean Patent Application No. 10-2018-0134693, filed Nov. 5, 2018, the entire contents of which is incorporated herein for all purposes by this reference.

BACKGROUND OF THE INVENTION

Field of the Invention

The present invention relates to a damping control method and system of a steering system for a vehicle, which can perform an active damping control by varying a damping amount depending on whether or not a steering wheel is being gripped.

Description of Related Art

A motor driven power steering (MDPS) system refers to a system that assists a steering force of a steering wheel using a motor. The MDPS system is operated to provide a steering force while a vehicle is being driven.

That is, an operation of a motor is controlled by an MDPS controller and an assistant steering force is provided to a driver by an assist torque from the motor, decreasing a degree of fatigue of a driver.

Furthermore, in a case where a steering wheel is steered and rotated, and then restored to a steering angle neutral position, a damping control is performed so that an assist torque from a motor is decreased. A damping amount of the motor is determined by a motor current, a vehicle velocity, and a steering angular velocity.

However, in the case of such a damping control, when the steering wheel is steered at a middle/high vehicle velocity, a steering feel deteriorates due to the excessive damping amount. Therefore, the damping amount is required to be reduced.

In the instant case, if a damping amount is reduced to improve a steering feel, hand-free stability (yaw stability of a vehicle and convergence stability of a steering wheel at the time of release of steering after steering input by a driver when the vehicle travels at a middle/high vehicle velocity) is degraded due to increase in an amount of overshoot at the time of restoration of the steering wheel by a restoration moment.

That is, in a case where the steering wheel stably converges to a steering angle neutral position, a yaw rate damping time is shortened, resulting in the excellent hand-free stability. However, in particular, in a case where the steering wheel is restored to a steering angle neutral position in a state in which a driver takes his or her hands off the steering wheel (hand-off state), as illustrated in FIG. 3, a yaw rate damping is impaired by an excessive amount of overshoot of the steering wheel. Therefore, a behavior of a vehicle becomes unstable.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a damping control method and system of a steering system for a vehicle, which can perform an active damping control by varying a damping amount depending on whether or not a steering wheel is being gripped.

According to an exemplary embodiment of the present invention, a damping control method of a steering system for a vehicle may include: a basic damping value determining step of determining, by a controller, a basic damping value based on a vehicle velocity, a steering angular velocity, and an output value of a steering motor when it is determined that steering for restoring a steering wheel to a steering angle neutral position is to be performed; a hand-on/off determining step of determining, by the controller, whether a driver is in a hand-off state in which the driver takes his or her hands off the steering wheel according to signals reflecting a steering state and a behavior of a vehicle; a compensating step of compensating, by the controller, for the basic damping value so that the basic damping value is increased and determining a final damping value when it is determined that the driver is in the hand-off state; and a restoring steering control step of controlling, by the controller, the steering motor with the final damping value obtained by the compensation, and restoring and steering the steering wheel.

In the hand-on/off determining step, it may be determined that the driver is in the hand-off state when a steering torque is a predetermined value or less, a yaw rate is a predetermined value or less, and a lateral acceleration is a predetermined value or more.

In the compensating step, gain values may be set for a steering torque, a yaw rate, and a lateral acceleration, respectively, a compensation gain value may be determined by multiplying the gain values of the steering torque, the yaw rate, and the lateral acceleration, and a final damping value may be determined by adding the compensation gain value to the basic damping value.

$0 \leq$ steering torque gain value $\leq a$ may be satisfied in which the steering torque gain value is in inverse proportion to the steering torque, $0 \leq$ yaw rate gain value $\leq a$ may be satisfied in which the yaw rate gain value is in inverse proportion to the yaw rate, and $0 \leq$ lateral acceleration gain value $\leq a$ may be satisfied in which the lateral acceleration gain value is in proportion to the lateral acceleration.

In the hand-on/off determining step, it may be determined that the driver is in a hand-on state when a steering torque exceeds a predetermined value, a yaw rate exceeds a predetermined value, or a lateral acceleration is less than a predetermined value, and in the restoring steering control step, the steering motor may be controlled with the basic damping value and the steering wheel may be restored and steered when it is determined that the driver is in the hand-on state.

According to various exemplary embodiments of the present invention, a damping control system of a steering system for a vehicle may include: a basic damping value calculator configured to determine a basic damping value based on a vehicle velocity, a steering angular velocity, and an output value of a steering motor; a compensating calculator configured to determine whether a driver is in a hand-off state in which the driver takes his or her hands off a steering wheel according to signals reflecting a steering state and a behavior of a vehicle, and when it is determined that the driver is in the hand-off state, compensate for the basic damping value so that the basic damping value is increased and determine a compensation gain value; and a steering controller configured to determine a final damping value by adding the compensation gain value to the basic damping value and control the steering motor with the determined final damping value.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
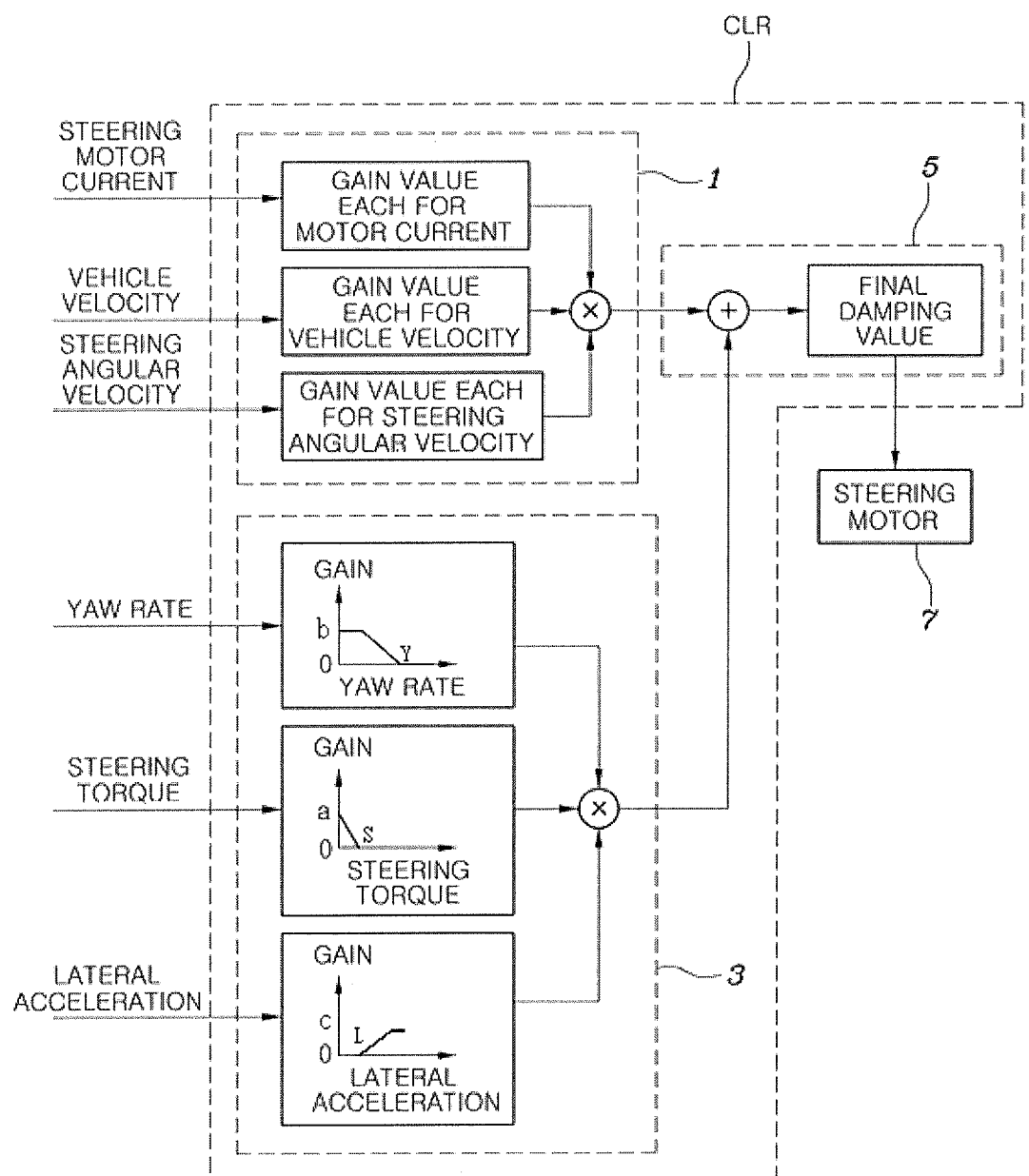
FIG. 1 is a block diagram schematically illustrating a damping control system according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Hereinafter, various exemplary embodiments of the present invention will be described in detail with reference to the accompanying drawings.

A damping control system of a steering system for a vehicle according to an exemplary embodiment of the present invention includes a basic damping value calculator 1, a compensating calculator 3, and a steering controller 5 and is configured to perform an active damping control by varying a damping amount depending on whether or not a steering wheel is being gripped.

A configuration of the damping control system will be described with reference to FIG. 1. First, the basic damping value calculator 1 determines a basic damping value based on a vehicle velocity, a steering angular velocity, and an output value of a steering motor 7.

As such, the compensating calculator 3 determines whether the driver is in a hand-off state in which the driver takes his or her hands off the steering wheel according to signals reflecting a steering state and a behavior of a vehicle, and when it is determined that the driver is in the hand-off state, compensates for the basic damping value so that it is increased and determines a compensation gain value.

As such, the steering controller 5 determines a final damping value by adding the compensation gain value to the basic damping value and controls the steering motor 7 with the determined final damping value.

According to such a configuration, in an exemplary embodiment of the present invention, when steering for restoring a steering wheel toward a steering angle neutral position (0°) is to be performed, in a case where it is determined that the driver is in a hand-off state in which the driver takes his or her hands off the steering wheel, damping control is performed by increasing a damping amount to be greater than the basic damping value, such that hand-free stability is improved.

Meanwhile, a damping control method of a steering system for a vehicle according to an exemplary embodiment of the present invention includes a basic damping determining step, a hand-on/off determining step, a compensating step, and a steering restoration step.

The present invention will be described in detail with reference to FIG. 1 and FIG. 2, first, in the basic damping determining step, a controller CLR determines a basic damping value based on a vehicle velocity, a steering angular velocity, and an output value of a steering motor 7 when it is determined that steering for restoring a steering wheel to a steering angle neutral position is to be performed.

For example, the controller CLR is configured to receive the vehicle velocity, the steering angular velocity, and the current of the steering motor 7 at the current time.

Herein, gain values are set for the vehicle velocity, the steering angular velocity, and the current of the steering motor 7, respectively, in the controller CLR. The gain values are determined that the higher the vehicle velocity is, the larger the vehicle velocity gain value is, the larger the steering angular velocity is, the larger steering angular velocity gain value is, and the smaller the motor current is, the larger the motor current gain value is.

Therefore, a basic damping value is determined by multiplying respective gain values determined as described above.

Furthermore, in the hand-on/off determining step, the controller CLR determines whether the driver is in a hand-off state in which the driver takes his or her hands off the steering wheel according to signals reflecting a steering state and a behavior of a vehicle.

For example, the signal reflecting the steering state may be a steering torque and the signal reflecting the behavior of the vehicle may be a yaw rate or a lateral acceleration. The controller CLR receives these signals.

In the instant case, it may be determined that the driver is in a hand-off state, when the steering torque is a predetermined value or less, the yaw rate is a predetermined value or less, and a lateral acceleration is a predetermined value or more.

Furthermore, in the compensating step, the controller CLR compensates the basic damping value so that it is increased and determines a final damping value when it is determined that the driver is in the hand-off state.

As such, in the restoring steering control step, the controller CLR controls the steering motor 7 with the final damping value obtained by the compensation, and restores and steers the steering wheel.

Figure 3:
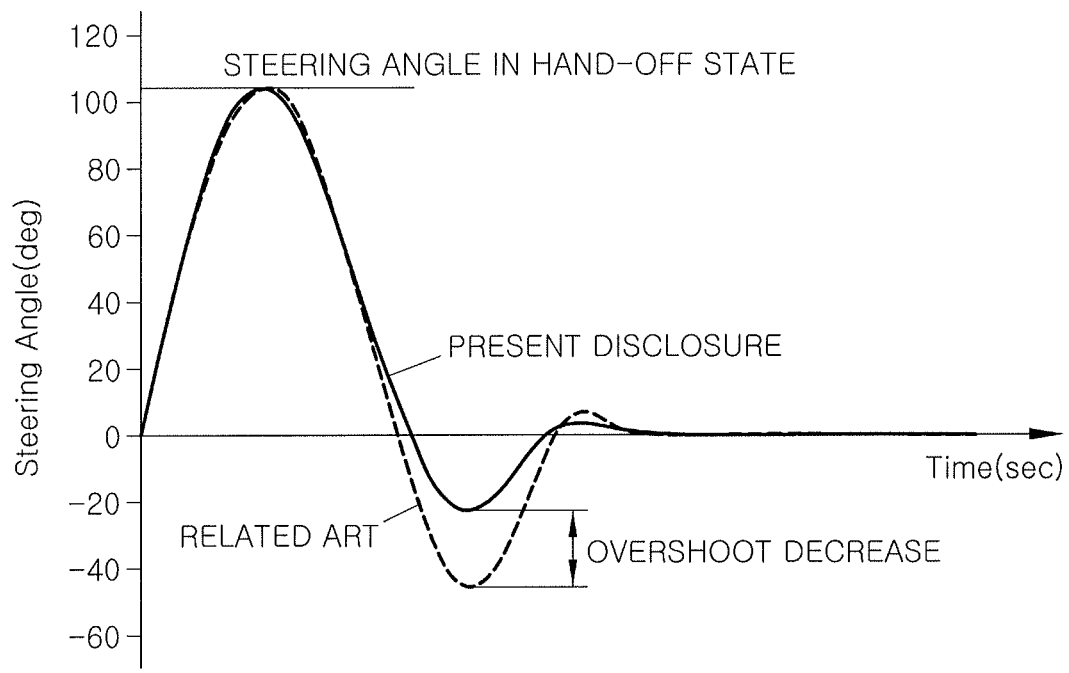
FIG. 3 is graphs illustrating a decrease amount of steering angle overshoot by comparing an amount of steering angle overshoot at the time of restoring steering of a steering wheel according to an exemplary embodiment of the present invention to an amount of steering angle overshoot at the time of restoring steering of a steering wheel according to the related art.
Figure 4:
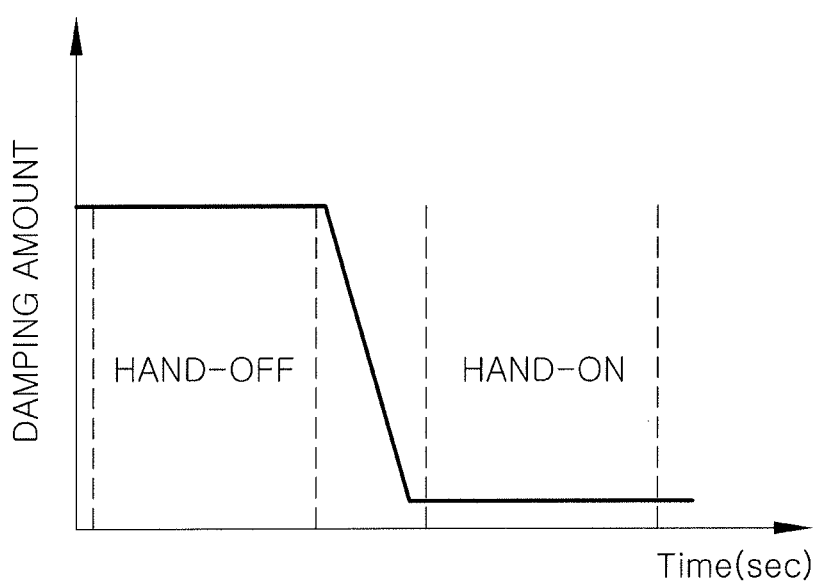
FIG. 4 is a graph illustrating damping amounts in a hand-on state and a hand-off state according to present invention.

That is, when steering for restoring the steering wheel to the steering angle neutral position is to be performed, in a case where it is determined that the driver is in a hand-off state in which the driver takes his or her hands off the steering wheel, as illustrated in FIG. 4, a damping control is performed by increasing a damping amount to be greater than the basic damping value. Accordingly, as illustrated FIG. 3, hand-free stability is improved by decreasing an amount of overshoot occurring at a steering angle neutral position compared to the related art.

Such an improved hand-free stability through the logic as described above is implemented without additional physical components, such that the improved hand-free stability may be realized with no additional cost.

A process of compensating the basic damping value in the compensating step according to an exemplary embodiment of the present invention will be described in detail with reference to FIG. 1. First, gain values are set for a steering torque, a yaw rate, a lateral acceleration, respectively.

As such, a compensation gain value is determined by multiplying the gain values of the steering torque, the yaw rate, and the lateral acceleration.

Subsequently, a final damping value is determined and obtained by adding the compensation gain value to the basic damping value.

That is, the gain values vary depending on the steering torque, the yaw rate, and the lateral acceleration, such that the determined final damping value may be variable in a state where the driver is in the hand-off state and then damping control may be actively performed in accordance with a travel state of a vehicle.

In the instant case, among the gain values, 0≤steering torque gain value≤a, in which the steering torque gain value is in inverse proportion to the steering torque.

Furthermore, 0≤yaw rate gain value≤b, in which the yaw rate gain value is in inverse proportion to the yaw rate.

Furthermore, 0≤lateral acceleration gain value≤c, in which the lateral acceleration gain value is in proportion to the lateral acceleration.

That is, the steering torque gain value is zero when the steering torque is a predetermined value S or more and the steering torque gain value increases as the steering torque approaches zero.

Furthermore, the yaw rate gain value is zero when the yaw rate is a predetermined value Y or more and the yaw rate gain value increases when the yaw rate is zero to the predetermined value Y or less.

Furthermore, the lateral acceleration gain value is zero when the lateral acceleration is zero to a predetermined value L and increases as the lateral acceleration increases more than the predetermined value L.

That is, damping control is performed with the final damping value determined by adding the compensation gain values obtained by multiplying the above three gain values to the basic damping value, such that hand-free stability is improved by increasing a damping amount in a restoring section of the steering wheel when the driver is in a hand-off state.

The damping control described above is a damping control where a driver is in a hand-off state in which the driver takes his or her hands off the steering wheel. When a driver is in a hand-on state in which the driver puts his or her hands on the steering wheel, a damping control is also performed with a basic damping value.

To the present end, in the hand-on/off determining step of the present invention, it is determined that the driver is in the hand-on state when a steering torque exceeds a predetermined value, a yaw rate exceeds a predetermined value, or a lateral acceleration is less than a predetermined value.

In the restoring steering control step, when it is determined that the driver is in the hand-on state, the steering motor 7 is controlled with the basic damping value and the steering wheel may be restored and steered.

That is, in a state where the driver is in the hand-on state, if one of the three gain values is zero, the product of the three gain values becomes zero. Therefore, since the compensation gain value also becomes zero, zero is added to the basic damping value, as a result the final damping value is not affected.

As described above, according to an exemplary embodiment of the present invention, an active damping control is performed by determining whether or not a steering wheel is being gripped by a driver and varying a damping amount at the time of restoring and rotating the steering wheel.

Hereinafter, damping control processes according to an exemplary embodiment of the present invention will be sequentially described.

Figure 2:
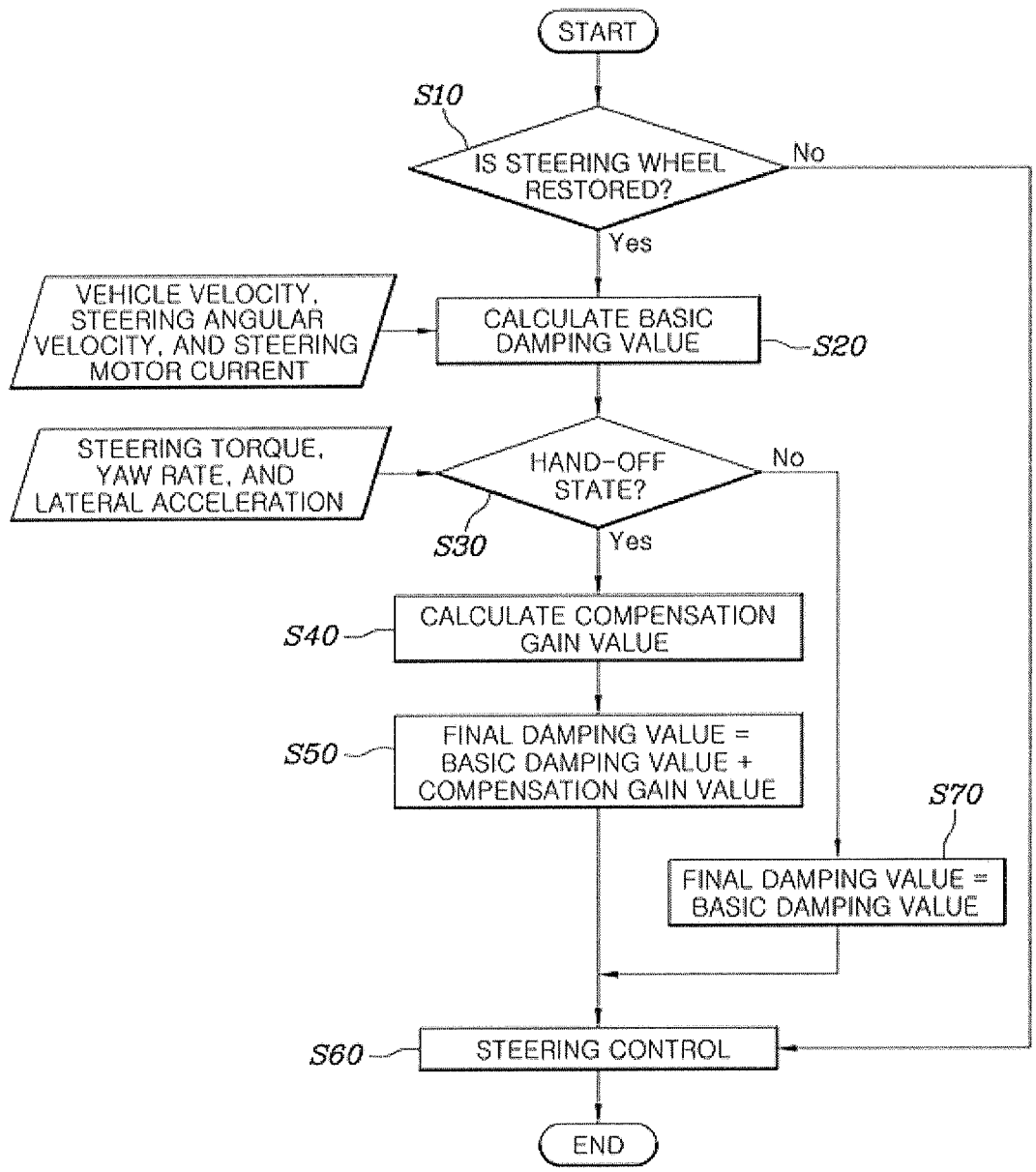
FIG. 2 is a flowchart sequentially illustrating damping control processes according to an exemplary embodiment of the present invention.

Referring to FIG. 2, it is determined that steering for restoring a steering wheel to a steering angle neutral position (0°) is to be performed after the steering wheel is steered and rotated in a certain direction (S10), and a basic damping value is determined based on a vehicle velocity, a steering angular velocity, and a current value of a steering motor 7 when it is determined that the steering is when the steering wheel is to be restored and steered (S20).

Subsequently, the controller receives a steering torque, a yaw rate, and a lateral acceleration and it is determined that the driver is in a hand-off state in which the driver takes his or her hands off the steering wheel or the driver is in a hand-on state in which the driver takes his or her hands on the steering wheel based on received signals (S30).

As the determination result in S30, when it is determined the driver is in the hand-off state, gain values are obtained for a steering torque, a yaw rate, and a lateral acceleration, respectively and a compensation gain value is determined by multiplying all the obtained gain values (S40).

Furthermore, a final damping value is determined by adding the determined compensation gain value to the basic damping value (S50) and damping control is performed on the steering motor 7 (S60).

Meanwhile, as the determination result in S30, when it is determined the driver is in the hand-on state, the basic damping value is determined as a final damping value and damping control is performed on the steering motor 7 with the basic damping value.

As described above, according to an exemplary embodiment of the present invention, it is possible to perform an active damping control depending on a steering state by a driver. That is, hand-free stability of a steering wheel is improved by increasing a damping amount in a state where the driver takes his or her hands off the steering wheel and a deterioration of a steering feel is prevented by maintaining a damping amount as it is in a state where the driver takes his or her hands on the steering wheel, resulting in the active damping control.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A damping control method of a steering system for a vehicle, the damping control method comprising:
    a basic damping value determining step of determining, by a controller, a basic damping value based on a vehicle velocity, a steering angular velocity, and an output value of a steering motor when it is determined by the controller that steering for restoring a steering wheel to a steering angle neutral position is to be performed;
    a hand-on/off determining step of determining, by the controller, when a driver is in a hand-off state in which the driver takes his or her hands off the steering wheel according to a steering state and a behavior of the vehicle;
    a compensating step of compensating, by the controller, for a determined basic damping value so that the determined basic damping value is changed and determining a final damping value when it is determined by the controller that the driver is in the hand-off state; and
    a restoring steering control step of controlling, by the controller, the steering motor with the final damping value obtained by the compensating, and restoring and steering the steering wheel by the final damping value,
    wherein in the basic damping value determining step determining step, the basic damping value is determined by multiplying a gain value predetermined for a current of the steering motor, a gain value predetermined for the vehicle velocity, and a gain value predetermined for the steering angular velocity.

2. The damping control method of claim 1,
    wherein in the restoring steering control step, the steering motor is controlled by the controller connected to the steering motor with the determined basic damping value and the steering wheel is restored and steered when it is determined by the controller that the driver is in the hand-on state.

3. The damping control method of claim 1, wherein in the hand-on/off determining step, it is determined by the controller that the driver is in the hand-off state when a steering torque is a first predetermined value or less, a yaw rate is a second predetermined value or less, and a lateral acceleration is a third predetermined value or more.

4. The damping control method of claim 1,
    wherein in the compensating step, a first gain value is predetermined for a steering torque, a second gain value is predetermined for a yaw rate, and a third gain value is predetermined for a lateral acceleration, a compensation gain value is determined by multiplying the first, second and gain values and the final damping value is determined by adding a determined compensation gain value to the determined basic damping value.

5. The damping control method of claim 4,
    wherein the first gain value is between zero and a first steering torque gain value, and the first gain value is in inverse proportion to the steering torque between zero and a predetermined steering torque,
    wherein the second gain value is between zero and a predetermined yaw rate gain value and the second gain value is in inverse proportion to the yaw rate between zero and a predetermined yaw rate, and
    wherein the third gain value is between zero and a predetermined lateral acceleration gain value, and the third gain value is in proportion to the lateral acceleration beyond a predetermined lateral acceleration.

6. The damping control method of claim 1, wherein in the hand-on/off determining step, it is determined by the controller that the driver is in a hand-on state when a steering torque exceeds a first predetermined value, a yaw rate exceeds a second predetermined value, or a lateral acceleration is less than a third predetermined value.

7. A damping control system of a steering system for a vehicle, the damping control system comprising:
    a basic damping value calculator configured to determine a basic damping value based on a vehicle velocity, a steering angular velocity, and an output value of a steering motor;
    a compensating calculator configured to determine when a driver is in a hand-off state in which the driver takes his or her hands off a steering wheel according to a steering state and a behavior of a vehicle, and when it is determined by the controller that the driver is in the hand-off state, compensate for a determined basic damping value so that the determined basic damping value is changed and determine a compensation gain value; and
    a steering controller configured to determine a final damping value by adding a determined compensation gain value to the determined basic damping value and control the steering motor with a determined final damping value,
    wherein in the basic damping value determining step determining step, the basic damping value is determined by multiplying a gain value predetermined for a current of the steering motor, a gain value predetermined for the vehicle velocity, and a gain value predetermined for the steering angular velocity.

8. The damping control system of claim 7,
    wherein a first gain value is predetermined for a steering torque, a second gain value is predetermined for a yaw rate, and a third gain value is predetermined for a lateral acceleration, a compensation gain value is determined by multiplying the first, second and gain values and the final damping value is determined by adding a determined compensation gain value to the determined basic damping value.

9. The damping control system of claim 8,
    wherein the first gain value is between zero and a first steering torque gain value, and the first gain value is in inverse proportion to the steering torque between zero and a predetermined steering torque,
    wherein the second gain value is between zero and a predetermined yaw rate gain value and the second gain value is in inverse proportion to the yaw rate between zero and a predetermined yaw rate, and wherein the third gain value is between zero and a predetermined lateral acceleration gain value, and the third gain value is in proportion to the lateral acceleration beyond a predetermined lateral acceleration.

10. The damping control system of claim 7, wherein it is determined by the controller that the driver is in the hand-off state when a steering torque is a first predetermined value or less, a yaw rate is a second predetermined value or less, and a lateral acceleration is a third predetermined value or more.

11. The damping control system of claim 7, wherein it is determined by the controller that the driver is in a hand-on state when a steering torque exceeds a first predetermined value, a yaw rate exceeds a second predetermined value, or a lateral acceleration is less than a third predetermined value.

* * * * *